Oct. 11, 1966   J. W. TAMPLEN   3,278,192
SEALING DEVICES

Filed Oct. 8, 1962

INVENTOR
Jack W. Tamplen

BY
*Hastings Ackley*
and
*Walter J. Jagmin*
ATTORNEYS

Oct. 11, 1966    J. W. TAMPLEN    3,278,192
SEALING DEVICES
Filed Oct. 8, 1962    2 Sheets-Sheet 2

INVENTOR
Jack W. Tamplen
BY C. Hastings Ackley
and Walter J. Jagmin
ATTORNEYS

United States Patent Office 3,278,192
Patented Oct. 11, 1966

3,278,192
SEALING DEVICES
Jack W. Tamplen, Celina, Tex., assignor to Otis Engineering Corporation, Dallas, Tex., a corporation of Delaware
Filed Oct. 8, 1962, Ser. No. 229,000
11 Claims. (Cl. 277—116.2)

This invention relates to new and useful improvements in sealing devices and more particularly to sealing devices for effecting a fluid tight seal between adjacent surfaces. This application is a continuation-in-part of my co-pending application, Serial No. 115,812, filed June 8, 1961, now Patent No. 3,215,208, for sealing devices.

One object of this invention is to provide a new and improved sealing device.

Another object of the invention is to provide a new and improved sealing device for sealing the gap between a tubular flow conductor and an object disposed therein.

Another object is to provide a new and improved sealing device for sealing the annular space between a tubular flow conductor and a tubular flow control device disposed in telescoped relationship therein.

Still another object is to provide a new and improved sealing device for sealing the annular gap between a pair of tubular flow conductors disposed in telescoped relationship to one another.

A further object is to provide a new and improved sealing device for providing a fluid tight seal within the bore of a tubular flow conductor and which seal is effective against fluid pressure acting in either longitudinal direction of the flow conductor.

Still another object of the invention is to provide a sealing device for a flow conductor, for use in a flow conductor, such as tubing or pipe, which sealing device is of small outside diameter relative to the inner diameter of the flow conductor in which it is used, so that it will readily pass through the bore of the flow conductor without damage or abrasion to the sealing device or wear on the wall of the flow conductor, and which is readily expandable into sealing engagement with the inner wall of the flow conductor.

A particular object of the invention is to provide an improved sealing element for well tools adapted to be initially mechanically expanded to sealing engagement with a well flow conductor and thereafter to be maintained in sealing position by fluid pressure acting thereon, and which has an outer skin layer of softer material which is adapted to effect a seal with the bore wall of the flow conductor under minimum pressure conditions and a principal body area of harder material for resisting deforming and cold flow under higher pressures.

A still further object of the invention is to provide a sealing device comprising a resilient elastic element which is mechanically expandable to effect an initial fluid-tight seal between adjacent surfaces, wherein compression of the resilient expansible portion is limited to a predetermined value.

Another object of the invention is to provide a new and improved resilient sealing element which is expandable upon compression to sealing engagement with a flow conductor and which is held in sealing position by a fluid pressure differential acting in either longitudinal direction across the sealing element in the flow conductor.

A particular object of the invention is to provide a sealing element which has an anti-extrusion means for preventing extrusion of the sealing element between the member on which it is mounted and the flow conductor in which such member is disposed.

A still further object of the invention is to provide an improved seal means of the character described which is readily disengaged from sealing engagement with the flow conductor in which the same is mounted.

A particular object of the invention is to provide a sealing element for use in a well flow conductor for sealing between a well tool disposed in such well flow conductor and embodying an initially retracted sealing element which can be expanded against the bore wall of the well flow conductor upon the application of a relatively low external mechanical force thereon, and which functions to seal by the application of fluid pressure thereto when expanded, in order that an increase in fluid pressure acting on the sealing element tends to increase its sealing effectiveness against the bore wall of the well conductor.

Additional objects and advantages of the invention will be readily apparent from the reading of the following description of a device constructed in accordance with the invention, and reference to the accompanying drawings thereof, wherein.

Figure 1:
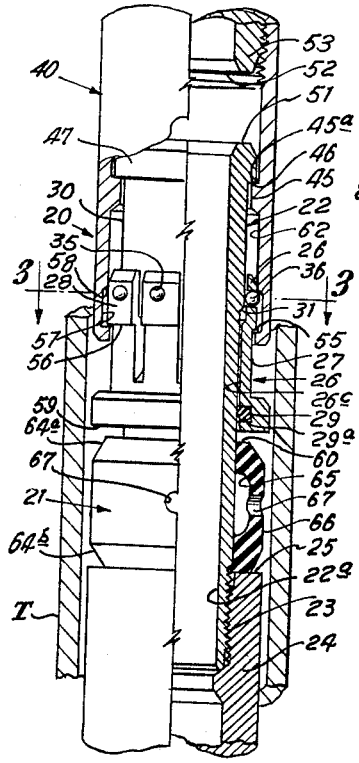
FIGURE 1 is a fragmentary view, partly in elevation and partly in section, showing a sealing device embodying the invention in retracted non-sealing position in a well tubing.
Figure 2:
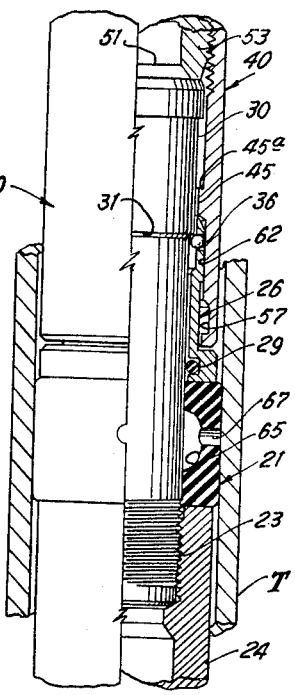
FIGURE 2 is a view similar to FIGURE 1 showing the sealing device in expanded sealing position.

Referring now particularly to FIGURES 1 and 2 of the drawing, the sealing device 20 embodying the invention is shown disposed within a flow conductor such as a well tubing string T. The sealing device includes an elastic, resilient sealing element 21 which is annular in form and slidably mounted about a tubular mandrel 22 having a bore 22a. To the lower end of the mandrel is attached, as by threads 23, a lower sub 24 whose upwardly facing end 25 supports the sealing element and limits downward displacement of the sealing element.

A cylindrical expander 26, having an internal bore 26c, is slidably mounted on the tubular mandrel above the sealing element and is adapted to be moved downwardly on the mandrel into engagement with the sealing element to compress and expand the sealing element. The expander is provided with upwardly extending fingers 27 having external bosses 28 at the upper free ends thereof. An O-ring 29 received within an internal annular groove 29a of the expander effects a seal between the expander and the mandrel to prevent the flow of fluids therebetween.

The mandrel 22 has an enlarged upper portion 30 thereof which provides an inwardly and downwardly extending external annular shoulder 31. The inner bore 26c of the expander is enlarged at its upper portion so that the fingers are adapted to telescope over the enlarged portion 30 of the mandrel, as shown in FIGURE 1.

The fingers 27 of the expander are each provided with an aperture 35 extending transversely therethrough and in which a ball 36 is disposed for radial movement relative to the expander. When the expander is slidably positioned on the mandrel with the apertures of the fingers adjacent the enlarged mandrel portion 30, the balls 36 project outwardly of the bosses of the expander fingers and are held in such expanded or projecting positions by the external surface of the enlarged portion of the mandrel.

A locking sleeve 40 is telescoped on mandrel 22 with a lower portion thereof also telescoped about the expander 26. The locking sleeve is provided with an internal annular flange 45. Upward movement of the locking sleeve relative to the mandrel is limited by the engagement of the upwardly facing shoulder 45a of the internal flange 45 with a downwardly facing external shoulder 46 provided by the external annular flange 47 of the mandrel. Downward movement of the locking sleeve relative to the mandrel is limited by engagement of the upper end 51 of the mandrel with the lower end 52 of an upper sub 53 which extends within the upper end portion of the locking sleeve and is threadedly connected thereto.

When the locking sleeve is in its uppermost position relative to the mandrel, as shown in FIGURE 1, the expander is supported on the locking sleeve by an internal annular upwardly facing shoulder 55 formed on the locking sleeve which engages the downwardly facing shoulders 56 provided by the bosses on the ends of the expander fingers. The outwardly projecting portions of the balls 36 which are now held in expanded positions by the enlarged portion 30 of the mandrel, are received in an internal annular recess 57 of the locking sleeve. The balls engage the inner wall of the locking sleeve within the recess 57 thereof and abut a downwardly and outwardly extending annular shoulder 58 of the locking sleeve which is provided by the recess. The balls thus prevent the locking sleeve from moving downwardly relative to the expander and the engagement of the upwardly facing shoulder 55 of the locking sleeve with the downwardly facing shoulders 56 of the expander fingers prevents the locking sleeve from moving upwardly relative to the expander. Thus, it is apparent that the locking sleeve and expander element are locked together against longitudinal movement relative to one another as long as the surface of the enlarged portion 30 of the mandrel is engaged by the balls 36.

A conventional line running and pulling tool, such as the running and pulling tool disclosed in U.S. Patent 2,348,563 to H. C. Otis, may be employed to engage the upper sub 53 and force the locking sleeve downwardly relative to the mandrel when it is desired to expand the sealing element. Of course, other suitable means for moving the locking sleeve may also be employed.

As the locking sleeve is moved from its uppermost position to its lowermost position, as shown in FIGURE 2, the engagement of its downwardly facing internal shoulder 58 with the balls 36 also causes the expander to move downwardly since the balls, confined within the apertures 35 of the expander fingers, transmit the downward force exerted on the locking sleeve to the expander. During such downward movement of the expander, its lower annular end surface 59 engages the upper end 60 of the sealing element 21 to compress the sealing element downwardly against the upper end 25 of the lower sub 24, thus causing the sealing element to expand radially outwardly.

As soon as the expander 26 has been moved downwardly a distance great enough to cause the balls 36 to move below the downwardly facing shoulder 31 of the mandrel, the balls are cammed inwardly by the annular shoulder 58 of the locking sleeve out of the recess 57 of the locking sleeve and out of engagement with the surface 30 of the mandrel. This inward movement of the balls disengages the balls from the shoulder 58 and frees the locking sleeve for downward movement relative to the expander. The locking sleeve is thus permitted to move further downwardly relative to the expander. The internal surface of the locking sleeve above the recess 57 now holds the balls in engagement with the outer surface of the mandrel and the engagement of the balls with the shoulder 31 of the mandrel locks the expander against upward displacement relative to the mandrel. In this position, with the balls 36 abutting the shoulder 31, the expander element is locked in its lower position on the mandrel.

It will thus be seen that the sealing element when engaged by the expander element can only be compressed to a degree determined by the limit of downward movement of the expander. The lowermost positions of the expander and locking sleeve are thus designed to permit compression of the sealing element to a predetermined degree which is sufficient to cause the sealing element to engage the inner wall of the tubing and effect a fluid-tight seal between the mandrel and tubing but will not result in overstress of the sealing element.

It will further be seen that the expander cannot be moved upwardly to permit relaxation of the sealing element until the locking sleeve is lifted sufficiently to align its internal recess 57 with the balls 36 to allow them to move out of engagement with the downwardly facing shoulder 31 of the mandrel and thus permit upward movement of the expander on the mandrel.

The sealing element 21, which is adapted to seal between the tubing and the mandrel, is formed of rubber or other suitable resilient material and is provided with an outside diameter such that the element will pass readily through the bore of the tubing string with ample clearance.

The upper and lower annular leading surfaces 64a and 64b of the sealing element are outwardly convergent to facilitate movement of the sealing element past obstructions in the tubing as the device is lowered or raised therein. Further, if desired, the external diameter of the sealing element may be made slightly smaller than that of the expander 26 and the lower sub 24 to protect the sealing element against abrasion and wear which might otherwise be caused by the dragging engagement of the sealing element with the wall of the flow conductor.

The sealing element is formed with an internal annular recess 65, to provide a relatively thin and flexible side wall portion 66 which renders the element more readily compressible and expansible. A plurality of lateral apertures 67 formed in the thin wall section of the sealing element communicate the exterior thereof with the internal recess 65. The apertures prevent the trapping of fluid of low pressure or atmospheric pressure between the mandrel and the sealing element within the recess 65, which trapped fluids would otherwise cause the sealing element to collapse out of sealing engagement with the tubing under greater external pressures applied thereto.

Referring to FIGURE 2, it will be seen that fluid pressure acting on the sealing element from below will tend to extrude the element into the gap between the tubing and the expander 26. The fluid pressure, however, will readily pass between the tubing and the sealing element until reaching the apertures 67 which permit the fluid to enter the recess 65 and equalize the fluid pressure in the recess with the pressure from below. The upper portion of the sealing element now acts in the manner of a conventional cup type seal and is held by the fluid pressure from below in expanded sealing engagement with the tubing. In a similar manner, if fluid pressure from above the sealing element exceeds the pressure from below, the fluid from above would also pass between the tubing and the element and into the recess 65 through the apertures 67 thereby equalizing the pressures in the recess with the pressure from above. Consequently, the lower portion of the sealing element, like the upper portion thereof, also acts like a conventional cup type seal and is held by the fluid pressure from above in expanded position in sealing engagement with the tubing. It will be apparent that the sealing element constitute, in effect, a pair of oppositely facing cup type seals which will withstand pressure differentials in either longitudinal direction in the well tubing and will effectively seal regardless of the direction of the pressure differential in the tubing.

Figure 5:
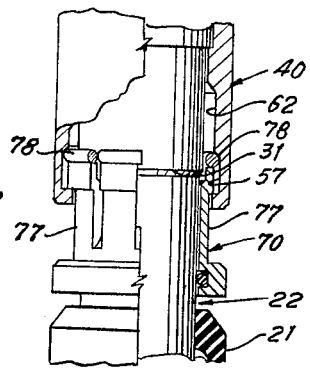
FIGURE 5 is a fragmentary view, partly in elevation and partly in section, showing a modified form of an expanding and locking means for operating the sealing device of FIGURES 1 and 2.

A modified form of expander element 70, which may also be used in the sealing device 20 in place of the expander element 26 is shown in FIGURE 5. The expander element 70 is similar to the expander element 26 but is provided with shorter fingers 77 having squared ends. In addition, instead of the locking balls 36 and apertures 35 in the fingers for receiving and supporting the balls, the expander element has a plurality of arcuate shaped lock segments 78 which are made of wire or other similar rod-like material and supported on the squared ends of the expander fingers. If desired, the segments may be substituted for a split ring which is normally biased outwardly to an external diameter corresponding to the diameter of the locking sleeve recess 57. The lock segments, like the balls 36, are adapted to cooperate with the downwardly facing shoulder 58 of the lock sleeve as the lock sleeve moves downwardly to move the expander downwardly and expand the sealing element into sealing engagement with the tubing. Like the balls 36, the lock segments are also adapted to engage with the downwardly facing shoulder 31 of the mandrel and the locking sleeve for locking the expander against upward movement relative to the mandrel when the locking sleeve is in its lowermost position. The lock segments of the expander 70 provide a greater bearing area for cooperatively engaging the mandrel and locking sleeve than is obtainable with the balls 36 of the expander 26. The sealing device when equipped with an expander element 70 can thus withstand much greater pressure differentials than when equipped with the expander 26.

Figure 4:
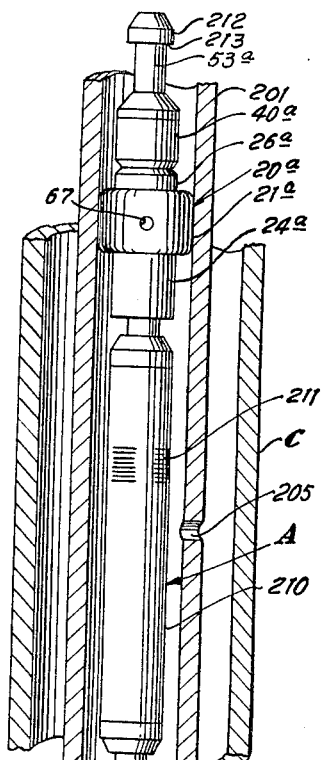
FIGURE 4 is a fragmentary view, partly in elevation and partly in section, showing sealing devices embodying this invention in use with a pack-off gas lift assembly installed in a well tubing string.
Figure 3:
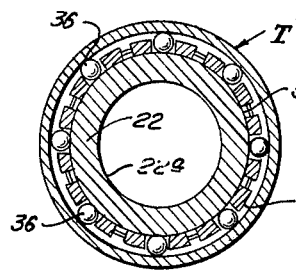
FIGURE 3 is a sectional view taken on the line 3—3 of FIGURE 1.

In FIGURE 4 is illustrated the use of the sealing device of this invention as the pack-off gas lift assembly A installed within a producing gas well. The installation is similar to the Otis Pack-Off Gas Lift Installation illustrated on page 4294 of the Composite Catalog of Oil Field Equipment and Services, 1960 edition.

The gas lift assembly is disposed within a tubing string T suspended within a well casing C. The tubing string is made up of a plurality of tubing sections, such as the sections 201 and 202, which are joined by a coupling 203 of the tubing string with the ends of the tubing sections provide recesses 204. A lateral port 205 is provided in the tubing section 201 to admit gas into the tubing string from the annulus between the tubing and the well casing. A collar stop 206 of any suitable type is installed within the tubing string so that its outwardly projecting lugs or bosses 207 are disposed within the first coupling recess 204 of the tubing below the lateral port 205 to lock the stop in the tubing against upward or downward movement therein.

The pack-off gas lift assembly A consists primarily of a gas lift valve 210 to which sealing devices 20a and 20b are attached at the upper and lower ends thereof. A gas lift valve which may be used in the assembly is disclosed in the U.S. Patent No. 2,642,889 to L. L. Cummings.

The sealing devices 20a and 20b are connected to the opposite ends of the valve by their sub sections 24a and 24b, respectively, whereby the locking sleeve 40b and connecting sub or collet 53b of the lower device comprises the lower end of the assembly and the locking sleeve 40a and sub 53a of the upper device comprise the upper end portion of the assembly. The upper sub 53a of the upper sealing device 20a is provided with a pulling flange 212, the downwardly facing shoulder 213 of which is adapted to be engaged by conventional tools, such as a flexible line running and pulling tool by which the assembly may be installed and removed from the tubing.

When it is desired to install the assembly in the tubing, the assembly is lowered therein until the sub or collet 53b engages the collar stop 206 whereupon one of the sealing devices is disposed above the lateral port 205 and the other is below. Gas entering the tubing T through the port 205 cannot escape past either of the sealing devices but can enter the gas lift valve through the slots 211.

The conventional line running and pulling tool by which the assembly is lowered into the tubing and which is engageable with the upper sub 53a of the upper sealing device may be employed to effect the compression and expansion of the sealing elements 21a and 21b. The sealing element of the lower sealing device, which engages the collar stop 206 and is attached to the gas lift valve in inverted relation to the upper sealing device, will be compressed and expanded in response to downward force imparted to the assembly by the running and pulling tool. Downward force acting on the assembly will cause the assembly to move downwardly relative to the locking sleeve 40b whereupon the lower sealing element 21b will be compressed and expanded into sealing engagement with the tubing. Further downward force acting on the upper sub 53a of the upper sealing device will also cause the sealing element 21a to expand into sealing engagement with the tubing.

Thus, with the sealing element in sealing engagement with the inner wall of the tubing, the gas lift valve is adapted to control the admission of gas from the tubing-casing annulus into the production stream passing through the central passage of the assembly.

It will be noted that the lower connecting sub 53b is provided with collet fingers 53c having outwardly projecting bosses 53d which releasably engage the collar stop in an internal recess 215 in the bore 216 of the collar stop. Thus, in removal of the gas lift assembly, as the assembly is moved upwardly, the locking sleeve 40b will be restrained by engagement of the bosses 53d with the downwardly facing shoulder 217 formed by the recess in the collar stop until the locking sleeve reaches its fully unlocked position, after which further upward movement of the assembly disengages the collet fingers from the collar stop.

The applications of the sealing device disclosed herein, of course, are not limited to the particular application illustrated in FIGURE 4. The sealing devices are adapted for use with a wide variety of well tools such as safety valves, regulators, well head plugs, bridge plugs, and the like, the subs 53 and 24 being adapted to be connected to other elements of such well tools.

It will thus be seen that a sealing device for a flow conductor, such as tubing or pipe, is disclosed herein which is of small outside diameter relative to the inner diameter of the flow conductor in which it is used so that it will readily pass through the bore of the flow conductor without damage or abrasion, and which is readily expandable into sealing engagement with the inner wall of the flow conductor.

It will further be seen that the sealing device disclosed herein comprises a resilient elastic portion which is readily expansible to effect a fluid-tight seal between adjacent surfaces wherein compression of the resilient, expansible portion is limited to a predetermined amount.

Figure 6:
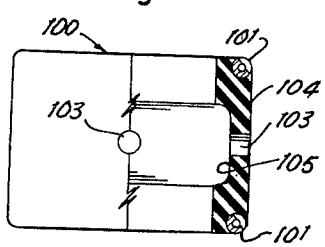
FIGURE 6 is a view, partly in elevation and partly in section, of a modified form of the resilient expandable sealing element employed in the sealing device of this invention.

A modified form of sealing element 100 which also may be used in the sealing device 20 is shown in FIGURE 6. As previously noted, a pressure differential acting on the sealing element 21 tends to extrude its resilient material into the annular gap between the tubing wall and the expander 26, or between the tubing wall and lower sub 24, depending upon the direction of the pressure differential. The sealing element 100 is provided with anti-extrusion members 101 which enable it to withstand much higher pressure differentials than the sealing element 21. Like the sealing element 21, the sealing element 100 is provided with a thin flexible wall 104, the lateral apertures 103 and an internal recess 105 and is otherwise substantially identical to the sealing element 21. The anti-extrusion members 101 are in the form of close-coiled tension garter springs and are superposed about the periphery of the sealing element 100 at both its upper and lower ends. Preferably, the anti-extrusion members 101 are molded into the sealing element at the time the sealing element is formed.

Figure 7:
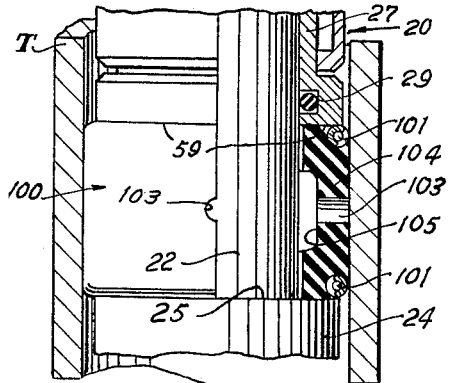
FIGURE 7 is a fragmentary view, partly in elevation and partly in section, showing the position which the sealing device of FIGURE 6 assumes in sealing between the well tool which carries the sealing device in the tubular well flow conductor in which the device is mounted.

When the sealing element is expanded to sealing position, as shown in FIGURE 7, the downstream end of the sealing element is displaced outwardly toward the annular space or opening between the well tool on which the sealing element is mounted and the bore wall of the well flow conductor. The anti-extrusion member 101 at such end of the sealing member is thus stretched slightly as the sealing element is moved to the expanded position and the anti-extrusion member being larger than the width of the annular opening between the well tool on which the sealing element is mounted and the bore wall of the casing, the anti-extrusion member cannot pass through such opening and forms a support for the resilient sealing material of the sealing element. With the anti-extrusion member in the position shown in FIGURE 7, the coils of the garter spring 101 are separated slightly to provide small spaces between the adjacent coils, but these spaces are so minute that the rubber or other resilient sealing material of which the sealing element is formed readily flows into the spaces and closes the same tightly without passing therethrough. The engagement of the anti-extrusion member with the lower end of the abutment face 59 of the well tool and with the bore wall of the well flow conductor or tubing string prevents movement of the garter spring or anti-extrusion element and therefore limits movement of the sealing element. Since the spring is normally substantially of a length which is only slightly smaller than the diameter of the bore of the well flow conductor or tubing string in which the device is used, only a slight amount of expansion is effected in the circumferential length of the anti-extrusion member and the spaces between adjacent coils of the spring forming the anti-extrusion member are so minute that they are practically negligible. Thus, the rubber or other sealing material forming the sealing member cannot flow through such spaces, whereby the sealing element with the anti-extrusion member 101 incorporated therein is able to withstand several times as much pressure differential as the sealing element 21 which has previously been described and which does not include the anti-extrusion member.

Regardless of whether the sealing element 21 or the sealing element 100 is used, fluid pressure will be trapped in the internal annular recess in the element when the pressure exteriorly of the sealing element is reduced. This is because the sealing element acts as a pair of oppositely facing cup-type seals, with the inturned flanges at the opposite ends of the cut and the longitudinal central portion on opposite sides of the apertures or ports 67 and 103 engaging and sealing between the abutment shoulders 59 and 25 and the bore wall of the tubing or flow conductor T so that fluid pressure cannot escape from the space within the sealing element. It is important, therefore, that at the beginning of the removal operation, when the expander sleeve is unlocked and moved longitudinally away from the sealing element to free the sealing element for movement to its unexpanded retracted non-sealing position, the sealing element be permitted to be moved longitudinally by the trapped pressure in the internal annular recess therein in the manner shown in FIGURE 8 to elongate the element and permit the trapped fluid pressure to escape from between the sealing element and the mandrel and between the sealing element and the expander and abutment shoulders 59 or 25. The pressure escaping from the internal annular space within the sealing element permits the central portion of the sealing element to resiliently retract inwardly from engagement with the bore wall of the flow conductor, and thus will open the lateral ports 67 or 103 of the sealing element to completely free the sealing element of any trapped pressure in the space 65 or 105 between the sealing element and the mandrel, thereby providing open communication and equalization of pressures between the recess in the sealing element and the exterior thereof and permitting the sealing element to return to its normal unexpanded position.

Figure 8:
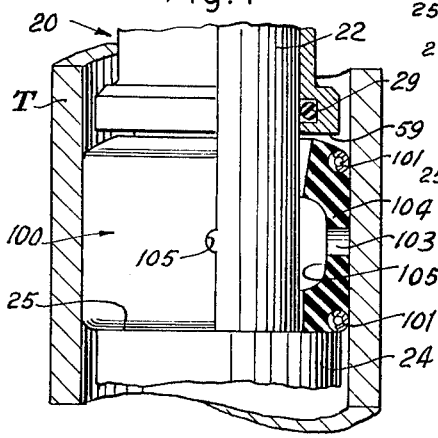
FIGURE 8 is a view, partly in elevation and partly in section, showing the manner in which the fluid pressure is released from within the sealing element of FIGURE 6 when the device is to be removed from the well flow conductor.

Initial longitudinal movement of the mandrel on which the sealing element is mounted in either direction, after the expander sleeve has been moved to the unlocked non-expanding position, will assist in the elongation of the sealing element in the manner shown in FIGURE 8 and will thus result in the releasing of pressure trapped within the internal annular space within the element in the manner just described to permit the sealing element to return to its normal unexpanded position.

A further modified form of sealing element 250 is shown in FIGURES 9 through 12, inclusive, and is also designed to be used in the sealing device 20 for sealing between the mandrel of the sealing device and the bore wall of the well flow conductor or tubing string T.

The sealing element 250 is provided with anti-extrusion members 251 and 252 which enable it to withstand much higher pressure differentials in the same manner as the sealing element 100. It is preferable that the anti-extrusion members be formed of closely coiled substantially square cross-section wire wound into a helical coil garter spring with the helical coils thereof lying in substantial lateral contact with each other; but, obviously, the members may be formed of wire of round or other cross-sectional shapes, if desired. The anti-extrusion members 251 and 252 are provided at both the upper and lower outer peripheral ends of the sealing element, and each is preferably molded into the sealing element at the time the sealing element itself is formed.

Figures 10, 11:
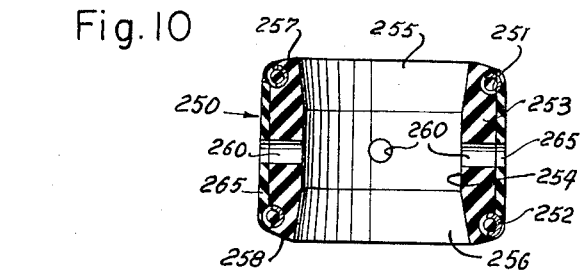
FIGURE 10 is a view, partly in elevation and partly in section, similar to FIGURE 1, showing a sealing device having the modified form of sealing element embodying the invention and disposed in retracted non-sealing position.
FIGURE 11 is a view similar to FIGURE 10 showing the sealing device and element in expanded sealing position.
Figures 9, 13:
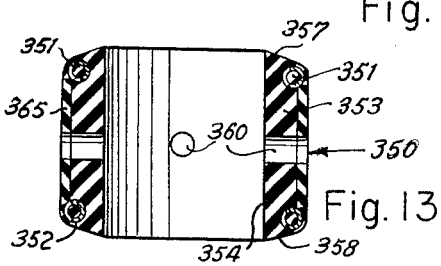
FIGURE 9 is an enlarged vertical cross-sectional view of a further modified form of sealing element.

As is clearly shown in FIGURES 9 and 10 of the drawings, the sealing element 250 is formed in substantially a tubular cylindrical shaped body 253 having a bore 254 which is flared outwardly slightly at 255 and 256 between the midportion of the sealing element and the extreme opposite ends thereof. Furthermore, the upper and lower ends of the sealing element are inclined inwardly and divergently as shown at 257 and 258 for a purpose which will be hereinafter more fully explained. In the intermediate portion of the substantially cylindrical sealing element are formed a plurality of circumferentially spaced lateral apertures or ports 260 corresponding to the ports 67 and 105 of the elements previously described.

An outer layer 265 of a polymeric substance, such as rubber or the like, is formed integral with and coextensive with the exterior cylindrical surface of the body 253 of the sealing element and extends from the anti-extrusion member 251 at one end to the anti-extrusion member 252 at the opposite end of the element. It is preferable that the outer layer of the polymeric or rubberlike material of the sealing element forming the outer sheath 265 be of a lower durometer value (about 35–50) than the main body 253 of the sealing element, whereby the softer outer layer of the element will readily seal with rough irregular surfaces in the tubing string or bore wall of the flow conductor T in which the element is used. The higher durometer test (about 75–85) and stronger inner material of the sealing element is also joined with and bonded to the anti-extrusion members at the opposite ends thereof and is of a sufficient strength to resist extrusion and to effectively seal and prevent complete deformation when in use.

As is clearly shown in FIGURE 10, the length of the sealing element 250 is preferably less than the length between the shoulder 25 of the well tool and the shoulder of the expander element 59, so that the sealing element is normally in the undistorted non-sealing position shown in FIGURE 10 with the outer cylindrical surface thereof out of engagement with the bore wall of the well flow conductor or tubing string. When the well tool has been lowered to the desired position in the flow conductor and the expander element has been moved downwardly longitudinally into expanded engagement with the adjacent end of the sealing element to distort the same longitudinally, it is readily apparent that the sealing element will be foreshortened and radially expanded in diameter into initial mechanical engagement with the bore wall of the well flow conductor as shown in FIGURE 11. In this position, the soft outer skin 265 of the sealing element will close off flow between the sealing element and the well flow conductor and well fluids from below and exteriorly of the well tool mandrel 24 will be trapped below the sealing element and may pass upwardly and enter through the ports 260 into the bore of the sealing element exterior of the mandrel 22 and the bore wall of the sealing element.

The pressure thus entering between the sealing element and the mandrel will move the upper portion of the sealing element outwardly in the manner shown in FIGURE 11, since the inwardly and upwardly beveled upper end portion 257 of the sealing element has engaged the lower downwardly facing shoulder 59 of the expander element and seals therewith. Since the sealing element is in sealing engagement with the shoulder 59 and with the bore wall of the tubing string T, it is apparent that that portion of the sealing element above the ports 260 will tend to be moved toward and urged to pass through the annular space between the exterior of the expander element carrying the shoulder 59 and the bore wall of the flow conductor. The anti-extrusion element will, since it is larger in diameter than the annular gap between the expander element and the tubing wall, be prevented from passing through the annular gap or space, and will likewise prevent extrusion or cold flow of the rubber-like material of the sealing element through such space. Since the anti-extrusion element is made of closely wound helical coils of resilient wire, preferably square in cross section, the very minute spaces between the adjoining or adjacent coils of the helical coiled anti-extrusion member will prevent flow of rubber therethrough even under substantial pressure differentials acting on the sealing element. This is particularly true where the adjacent sides of the coils are defined by planar surfaces resulting from the use of the square cross-sectional wire. It is also believed possible that the planar sides of the adjacent coils of the square wire may actually tilt and lap in substantial abutting relationship due to their helical convolutions when subjected to extremely high pressures, and thus form an even more positive barrier to the flow of rubber through the annular gap between the expander element and the bore wall of the tubing or flow conductor.

Since the annular O-ring seal member 29 prevents flow of fluids between the expander element and the mandrel 22, the annular gap between the expander element and the bore wall of the tubing is the only space through which fluid pressure can flow, and the sealing element 250 being initially mechanically moved into engagement with the bore wall of the tubing string by the compressive engagement of the opposite ends thereof by the upwardly facing shoulder 25 and the downwardly facing shoulder 59, the entire mass of rubber-like material serves to seal the annular space, the anti-extrusion element preventing flow of the material through the annular space or gap even under high pressure. It is not necessary that the sealing element have a cup-like shape, but merely that the element be sufficiently foreshortened or deformed to bring the outer lower durometer test softer sealing skin portion 265 of the sealing element into engagement with the bore wall of the tubing or flow conductor in the manner shown in FIGURE 11. The outwardly flared upper portion 255 and lower portion 256 of the bore of the sleeve permits the formation of an annular space between the adjacent end portion of the sealing element and the mandrel of the well tool, as shown in FIGURE 11, when the sealing element is moved to sealing engagement with the tubing. The ports 260 in the central portion of the body permit entry of fluid pressure from exteriorly of the sealing element below the upper portion thereof into the space between the sealing element and the mandrel and assure that the sealing element is flowed toward the annular gap between the expander element and the flow conductor wall. Likewise, these flared portions positively permit retraction of the end portions of the sealing element after the same has been in sealing position for some time and the pressure differential thereacross is released by moving the expander element to the unlocked non-compressing position.

Figure 12:
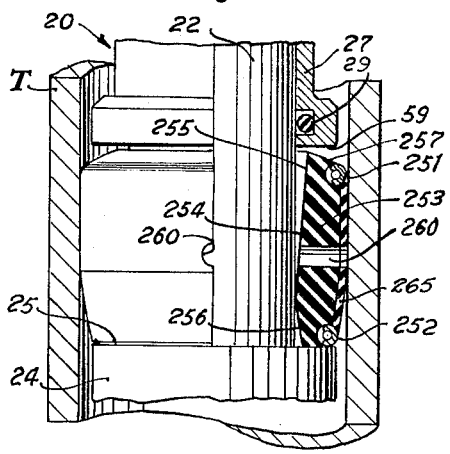
FIGURE 12 is a view showing the sealing element of FIGURE 10 in the position which it assumes to permit release of pressure from within the sealing element and removal of the device from the well flow conductor; and, FIGURE 13 is a view, similar to FIGURE 9, of a slightly modified form of the sealing element.

When the expander element is moved longitudinally on the mandrel to the position shown in FIGURE 12, the fluid pressure within the element moves upwardly along the bore thereof through the flared portion to the space between the upper end of the sealing element and the expander element and thence outwardly thereabove, whereupon the resilient sealing element, assisted by the resilient anti-extrusion member adjacent such end portion, will return to its normal undistorted non-sealing position as shown in FIGURE 10. Thus, the pressure of fluid which has been trapped within the sealing element between the sealing element and the mandrel and the expander member is permitted to escape outwardly between the upper end of the element and also through the ports 260 to the exterior thereof to permit the retraction and contraction of the sealing element.

The outwardly and upwardly flared portion 255 and the outwardly and downwardly flared portion 256 of the bore of the sealing element likewise facilitate assembly of the sealing element on the mandrel of the well tool. The divergent beveled surfaces 257 and 258 at the ends of the element provide for an initial sealing deformation of the sealing element engaging the shoulders 59 and 25, respectively, of the well tool on which the element is mounted to assure that the ends of the sealing element are in sealing engagement with such shoulders when the element is foreshortened to expand the outer cylindrical soft lower durometer test outer surface skin of synthetic rubber or polymeric material into sealing engagement with the bore wall of the flow conductor in which the device is used. Also, due to the triangular form of the inner portions of the sealing elements defined by the end surfaces 257 and 258, it is readily apparent that a tilting compressive wedging action takes place at each end of the element which forces the anti-extrusion members outwardly toward the gap between the shoulders 59 and 25 and the wall of the flow conductor. The anti-extrusion members clearly resist and prevent cold flow or extrusion of the sealing material of the sealing element through the annular gap or space between the expander member or the well tool and the bore wall of the well flow conductor in which the well tool is mounted, so that the element will withstand extremely high pressure differentials across the sealing element.

Likewise, the anti-extrusion members 251 and 252 provide for positive retraction of the end portions of the sealing element when the pressure differential is relieved therefrom, since these anti-extrusion members are in the form of closely wound garter springs normally of a circumferential dimension smaller than the circumference of the bore wall of the conductor in which they are to be used. Such retraction of the sealing element is facilitated by the provision of the ports 260 in the central portions of the sleeve. It is to be noted that the sealing element in its normal undistorted condition is of smaller diameter externally than the diameter of the bore of the flow conductor, and thus does not drag along or wearingly contact such flow conductor until the element has been expanded to sealing position. The fact that the sleeve is made of a substantially cylindrical section provides a larger mass of resilient sealing material which provides for a stronger, more effective seal which will withstand a larger pressure differential applied to the sealing element.

It will therefore be seen that a new and improved sealing element has been provided which comprises a substantially cylindrical tubular sealing member having resilient anti-extrusion elements at its opposite ends, and which is provided with a low durometer test, softer exterior sealing skin integral with a higher strength main body of polymeric material which is adapted to be initially mechanically moved into sealing engagement with a well flow conductor for sealing between a well tool in place therein, and that the sealing element is particularly adapted for ready release from sealing engagement with the well flow conductor and movement therethrough without dragging along the wall of the flow conductor, thus preventing wear on the sealing element and reducing damage to coatings or the like on the bore wall of the flow conductor.

It is believed readily apparent that, if desired, the sealing element may be modified as shown in FIGURE 13, wherein the body 353 of the sealing element 350 is provided with a uniformly cylindrical bore 354 which does not have the outwardly flared portions 255 and 256 of the form shown in FIGURE 9. In the form of the sealing element shown in FIGURE 13, it is readily apparent that the compressive wedging action between the inclined end surfaces 357 and 358 of such element and the abutment shoulders of the well device on which the sealing element is located will result in a prompt and efficient lateral wedging compressive movement of the end portions of said sealing element outwardly to force the anti-extrusion members 351 and 352, respectively, outwardly in the manner previously described. Since there is no space between the bore wall 354 of the sealing element and the exterior of the mandrel on which the device is mounted, it is believed readily apparent that the anti-extrusion element will be forced outwardly toward the gap between the shoulders and the bore wall of the well flow conductor more quickly than in the form previously described. Otherwise, the construction, function and operation of the sealing element of FIGURE 13 is identical to that of FIGURE 9 and similar parts have been illustrated with corresponding members.

It is also believed readily apparent that the sealing element of FIGURES 1 through 8 may be provided with an external softer lower durometer test polymeric sealing skin comparable to the skin 265 of the form of FIGURE 9 and the skin 365 of the form of FIGURE 13. This will facilitate sealing engagement between the sealing elements and the bore wall of the well flow conductor. This will be particularly desirable in the form shown in FIGURE 6, wherein the anti-extrusion members would tend to bias the end portions of the sealing element inwardly to retracted positions.

All advantages of these modified forms of the sealing elements are in addition to the advantages heretofore set forth for the forms first described.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A sealing element comprising: a cylindrical resilient expansible member having a bore extending axially therethrough; a pair of close-coiled tension garter springs superposed about the periphery of said resilient expansible member for reinforcing said resilient member, one of said springs being located at each end of said resilient member, said resilient member having a lateral port communicating the exterior of said resilient member with the bore thereof whereby said sealing element when expanded in sealing engagement between a flow conductor and a mandrel disposed therein seals against pressure differentials in either longitudinal direction of said flow conductor, and opposite longitudinally outwardly facing inclined abutment surfaces on the opposite ends of said resilient member extending from the outer surface thereof to the bore thereof and providing means for deforming the central portion of said cylindrical resilient member outwardly toward radially expanded initial sealing engagement with the flow conductor on opposite longitudinal sides of said port.

2. A sealing element comprising: an annular cylindrical resilient sealing member having a longitudinal bore therethrough and a lateral port communicating the bore of said member with the exterior thereof intermediate the ends of said member, and a reinforcing means at one end of the exterior of said annular sealing member comprising a close coiled helical resilient continuous metallic member fixed in the exterior of such end of said sealing member, and opposite longitudinally outwardly facing inclined surfaces on the opposite ends of said sealing member extending from the outer surface thereof to the bore thereof and providing means for application of longitudinal compressive force to the opposite ends of said sealing member for deforming the central portion of said sealing member between the ends thereof and said port radially outwardly of said sealing member toward initial sealing position.

3. A sealing element comprising: an annular cylindrical resilient sealing member having a longitudinal bore therethrough and a lateral port communicating the bore of said member with the exterior thereof intermediate the ends of said member, and a reinforcing means at each end of the exterior of said annular sealing member comprising a close coiled helical continuous resilient metallic member fixed in the exterior of such end portion of said sealing member, and opposed inwardly divergent abutment surfaces at the opposite ends of said cylindrical resilient member extending from the outer surface thereto to the bore thereof and providing means for deforming the adjacent central portion of said cylindrical sealing member outwardly radially toward initial sealing position.

4. A sealing element comprising: an annular cylindrical resilient sealing member having a length greater than the wall thickness of the cylindrical annular member and having a port communicating between the exterior and the bore of said member intermediate the ends thereof; and a pair of longitudinally spaced anti-extrusion members molded in the outer end peripheral portions of the sealing element, said anti-extrusion members being in the form of helical coiled springs having closely adjacent convolutions and extending continuously around the peripheral ends of said sealing element, and opposed inwardly divergent frusto-conical abutment faces at the opposite ends of said annular sealing member extending from the outer surface of said sealing member to the bore thereof and providing means for deforming the adjacent intermediate portion of said cylindrical sealing member outwardly radially toward expanded position upon application of longitudinal compressive force to the ends of said sealing member.

5. A sealing element comprising: an annular cylindrical resilient sealing member having a length greater than the wall thickness thereof and having a softer outer skin portion integral therewith, said sealing member having a port communicating between the exterior and the bore of said member intermediate the ends thereof; and reinforcing means at one end of the exterior of said annular sealing means and comprising a helical coiled resilient continuous metallic member affixed to said resilient sealing member; and opposed inwardly divergent frusto-conical abutment faces at the opposite ends of said annular sealing member providing means for deforming the adjacent intermediate portion of said cylindrical sealing member outwardly radially toward expanded position upon application of longitudinal compressive force to the ends of said sealing member.

6. A sealing element comprising: an annular cylindrical resilient sealing member having a length greater than the wall thickness thereof and having a softer outer skin portion integral therewith, said sealing member having a port communicating between the exterior and the bore of said member intermediate the ends thereof; and reinforcing means at each end of the exterior of said annular sealing means and comprising a helical coiled resilient continuous metallic member affixed to said resilient sealing member; and inwardly divergent frusto-conical abutment faces at the opposite ends of said annular sealing member providing means for deforming the adjacent intermediate portion of said cylindrical sealing member outwardly radially toward expanded position upon application of longitudinal compressive force to the ends of said sealing member.

7. A sealing element comprising: an annular cylindrical resilient sealing member having a length greater than the wall thickness thereof and having a softer outer skin portion forming the cylindrical peripheral outer portion of said element, said sealing member having a port communicating between the exterior thereof and the bore of said member intermediate the ends thereof; the exterior softer outer skin portion of said sealing member having a durometer test value of about thirty-five to fifty durometer scale, the remainder of the body of said resilient sealing member having a durometer test value of about seventy to eighty-five durometer scale; and opposite longitudinally outwardly facing abutment surfaces on the opposite ends of said resilient member providing means for deforming the adjacent central portion of said cylindrical resilient member outwardly to radially expanded initial sealing engagement with a flow conductor on opposite longitudinal sides of said port by application of longitudinal force to the opposite ends of said member.

8. A sealing element comprising: an annular cylindrical resilient sealing member having a length greater than the wall thickness thereof and having a softer outer skin portion forming the cylindrical peripheral outer portion of said element, said sealing member having a port communicating between the exterior thereof and the bore of said member intermediate the ends thereof; the exterior softer outer skin portion of said sealing member having a durometer test value of about thirty-five to fifty durometer scale, the remainder of the body of said resilient sealing member having a durometer test value of about seventy to eighty-five durometer scale; and reinforcing means at each end of the exterior of said annular seal means and comprising an annular helical coiled resilient continuous metallic member affixed to said resilient sealing member and both the main body thereof and the exterior softer outer skin thereof; and opposite longitudinally outwardly facing inclined surfaces on the opposite ends of said sealing member extending from the outer peripheral surface thereof to the bore thereof and providing means for application of longitudinal compressive force to the opposite ends of said sealing member for deforming the central portion of said sealing member between said end portions and said port radially outwardly of said sealing member toward initial sealing position.

9. A sealing element comprising: an elongate annular resilient sealing member having a substantially cylindrical exterior surface and having a bore extending axially therethrough, said member having a port formed intermediate the ends of said exterior surface and communicating the exterior surface of said sealing element with the interior of said sealing element, reinforcing means at each end of the exterior of said annular sealing member, and opposite longitudinally outwardly facing inclined abutment surfaces on the opposite ends of said resilient member extending from the cylindrical exterior surface thereof to the bore thereof and providing means for application of longitudinal compressive force to opposite ends of said resilient member for deforming the central portion of said resilient member outwardly to radially expanded resilient sealing engagement with a flow conductor on opposite longitudinal sides of said port.

10. A sealing element for well tools adapted to be mounted on a central mandrel between external annular abutments on said mandrel, one movable longitudinally of said mandrel relative to the other and to be inserted therewith into a well flow conductor to seal between said mandrel and said flow conductor, said sealing element comprising: an annular one piece resilient sealing member having a length greater than the thickness of its annular wall, and having a lateral port intermediate its ends communicating the exterior surface of said element with the interior thereof; said member having inwardly divergent abutment surfaces means at its opposite ends engageable by said abutments on said mandrel upon movement of said abutments toward each other for causing the intermediate portion of said member to be distorted laterally outwardly relative to said mandrel into engagement with a well flow conductor, with the portion of the wall of said member having the lateral port therein in engagement with said flow conductor, whereby fluid pressure may pass between the exterior of said member and said flow conductor to said port and enter through said port into the interior of said member to hold the portion of said member downstream of said port in sealing engagement with said abutment and said flow conductor downstream of said port.

11. A sealing element comprising: an elongate annular resilient sealing member having a substantially cylindrical exterior surface and a port formed intermediate the ends of said exterior surface and communicating the exterior surface of said sealing member with the interior of said sealing member, and a resilient expansible reinforcing means embedded in the annular sealing member at each exterior end thereof for limiting deformation of such exterior end portion of said sealing member, and inwardly divergent annular abutment surface means at the opposite ends of said annular sealing member extending from the cylindrical exterior surface thereof to the interior thereof and providing means for deforming said adjacent portion of said sealing member outwardly radially from the longitudinal axis thereof upon the application of longitudinal compressive force to the opposite ends of said sealing to the opposite ends of said sealing element.

References Cited by the Examiner
UNITED STATES PATENTS

| | | | |
|---|---|---|---|
| 321,488 | 7/1885 | Dayhuff | 166—200 |
| 1,984,806 | 12/1934 | Pfefferle | 277—235 |
| 2,196,668 | 4/1940 | Ragan | 166—204 X |
| 2,325,556 | 7/1943 | Taylor et al. | 277—235 X |
| 2,988,148 | 6/1961 | Conrad et al. | 166—187 |
| 3,036,639 | 5/1962 | Baker | 166—201 |

CHARLES E. O'CONNELL, *Primary Examiner.*

C. D. JOHNSON, J. A. MALONEY, D. H. BROWN,
*Assistant Examiners.*